Figure 1:
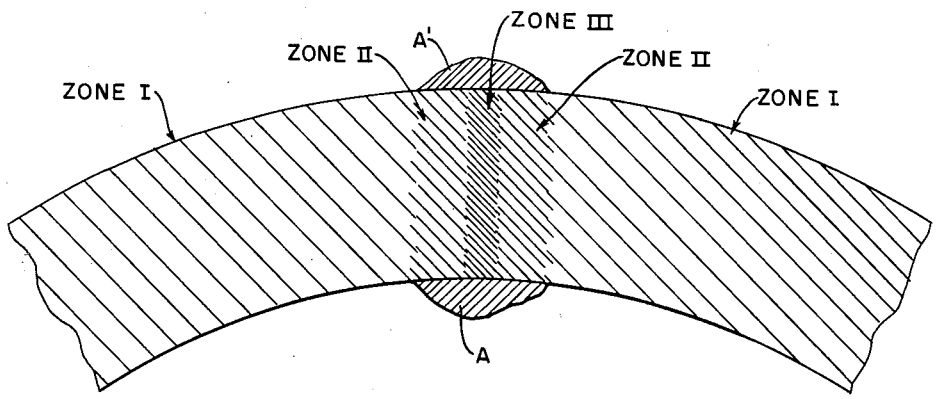

April 17, 1962     J. M. KENNEDY, JR     3,030,482

METHOD OF PRODUCING A STOCK TUBE OF WELDABLE METAL

Filed April 3, 1959

INVENTOR
JAMES M. KENNEDY, JR.

BY Pennie, Edmonds, Morton, Barrows & Taylor

ATTORNEYS

United States Patent Office

3,030,482
Patented Apr. 17, 1962

3,030,482
METHOD OF PRODUCING A STOCK TUBE OF WELDABLE METAL
James M. Kennedy, Jr., % Revere Copper & Brass Inc., Rome, N.Y.
Filed Apr. 3, 1959, Ser. No. 803,970
6 Claims. (Cl. 219—8.5)

This invention relates to the production of stock metal tubes which can be subsequently worked into finished tubes of different sizes by successive draws and anneals if necessary. The invention aims to provide a novel method of producing such stock tubes of a weldable metal, and especially of a copper-base metal. More particularly, the invention contemplates the production of such tubes by high frequency electric welding of the open seam in a tubular shape followed by annealing and drawing the welded tube to produce the stock tube.

Machines for welding tubes by the electric induction method and by the electric resistance method are well known in the art, and are generally adapted to weld into tubular shape a strip of any weldable metal, such as steel, copper, aluminum, etc. Commonly, the strip is initially formed into a tubular, open-seam shape, and the resulting tubular shape is progressively advanced through a welding zone where the edges of the seam are electrically heated to welding temperature and the heated edges are forced together by pressure rolls to effect the weld. In the induction welding method, an induction coil, positioned around the tubular shape, induces a circumferentially flowing electric current in the tubular shape. The action is essentially that of a transformer with the single- or multi-turn induction coil functioning as the primary and the tubular shape as the secondary. In the electric resistance method, electric contacts engaging the progressively moving tubular shape proximate the welding zone supply the welding current.

In producing tubes from strip metal by high frequency electric welding, it has heretofore been a common industrial practice to produce at the welding mill a finished tube of specified size. Accordingly, it has been most important that the weld be mechanically sound and strong at whatever sacrifice in welding speed is necessary to achieve this result. In fact, it has been common practice to produce a weld that has greater strength and ductility than the original strip. I have now discovered, however, that a significant increase in the speed of welding can be achieved when the welding operation is carried out to produce a weld of sound metallographic structure but of low mechanical strength and ductility weld, and that the mechanically weak weld can be strengthened to the necessary degree by subsequent annealing and cold working of the wall of the tube without impairing the sound metallographic structure of the weld. Due to its resulting uniform metallographic and mechanical characteristics, the tube may by successive draws, and anneals, if required, be finished to a desired size.

Based on the foregoing discoveries, the method of the invention comprises the initial step of longitudinally advancing an open seam tubular shape formed of a cold rolled weldable metal through a welding zone where the edge portions of the seam are heated to welding temperature by an electric current of high frequency and the heated edges are forced together by pressure to effect a mechanically weak and metallographically sound weld. The weld bead is continuously scarfed on both the inside and outside of the welded tube. The scarfed tube is now annealed to recrystallize the grain structure in the weld area, and then drawn to effect a reduction in wall thickness and to obtain cold working of the metal. At this stage the tube displays little evidence of welding and has the necessary uniformity of mechanical strength and of metallographic structure for subsequent finishing to size comparable to tubing manufactured by present day conventional (non-welding) seamless tube practices. It will be understood, accordingly, that the initially formed weld is "mechanically weak" only in the relative sense that it is mechanically weaker than the final weld structure and that the initial weld structure produced by previous commercial practice, although it is nevertheless nearly as strong as the initial strip from which the seamless tube is formed pursuant to the invention.

The method of the invention is particularly applicable for producing stock tubes of copper and copper-base alloys, but may be advantageously applied in producing stock tubes of any weldable metal, such as carbon steel, alloy steel, aluminum and alloys thereof, etc. Merely by way of example, the application of the invention to the production of stock copper tubing by electric induction welding is hereinafter more particularly described, and it is to be understood that stock tubing of other weldable metals can be similarly produced and that the invention is not limited to induction welding.

After the breakdown rolling passes, the copper bar is overhauled to remove all defects from its surface. In overhauling, a sufficient amount of the surface of the bar is cut away (commonly by a long milling type of rotating cutter) to remove dirt, scale, surface defects, and any small particles of iron that may have been shed by the breakdown rolls. The overhauled bar is then cold rolled to strip and finish rolled in the hard condition. The strip is then formed into a tubular shape having a longitudinal open seam in a multi-stand tube-forming machine of conventional design. The tubular shape is progressively advanced through the welding zone of a high frequency induction welder where the edge portions of the seam are heated to welding temperature by a circumferentially flowing electric current of high frequency induced in the shape by a surrounding induction coil, and the heated edges are forced together by pressure to effect a mechanically weak, but a metallographically continuous and sound weld. The weld bead is continuously scarfed, as welding proceeds, on both the inside and outside of the welded tube. The tube, as it leaves the welder, may be cut into straight lengths or coiled, the subsequent steps in completing the stock tube being essentially the same.

The tube is next cleaned and then annealed to recrystallize the grain structure in the weld area. After annealing, the tube has a uniform crystalline structure throughout. There may be a slight thinning of the tube wall at the weld section due to under-scarfing at this point, but this is of no practical significance.

The annealed tube is then drawn in order to effect a reduction in wall thickness and to obtain cold working of the metal. This draw also produces uniform wall thickness around the entire circumference of the tube. At this point, the tube has a uniformly sound metallographic structure and a uniformly strong mechanical structure. The annealed tube may be subjected to more than one draw, with intermediate anneals if required in order to produce a stock tube of the desired code specification. The resulting stock tube is thus left in its cold rolled or hard state and of a size that can be diverted to a number of different finished sizes. By successive draws, and anneals if necessary, the stock tube is subsequently finished to meet a then-called-for specification.

In plant practice it is sometimes preferable to stock the "as-welded" tube rather than the "as-welded, annealed and drawn" tube. This is particularly the case where the length of the finished tube is known, and where, upon receipt of an order, the "as-welded" stock tube will be withdrawn from stock, cleaned and annealed to uniform the grain structure. The subsequent draws (and anneals if required) that follow will be determined by the customer's specification for the finished tube. These specifications may require tubing of varying sizes with any temper from soft to hard. Additionally, the "as-welded" tube may be coiled and stocked, and subsequently cleaned, annealed and drawn, and then finished by successive draws and anneals if required. With coiled stock tube, the length requirement is not important.

Irrespective of whether the "as-welded" tube or the "annealed and drawn tube" is stocked for subsequent fabrication into finished tubing, the important and essential feature of the invention is the production of the mechanically weak and metallographically sound weld. As more particularly explained hereinafter, this weld is characterized by a dendritic structure of variable grain size having low tensile strength and ductility. A weld of this character is obtained by advancing the tubular shape through the welding zone at relatively high speed, usually much in excess of 100 feet per minute with brass for example, with relatively low electric power input. By the subsequent anneal, the variations in structure and grain size across the weld are uniformed, and the subsequent draw or series of draws effects cold working of the metal and produces uniform wall thickness around the entire circumference of the tube.

The following processing schedules illustrate, merely by way of example, practices of the invention for producing "as-welded" and "welded-annealed drawn" stock tubes, respectively:

Schedule I

[1.250" O.D. x 0.032" wall—hard brass tubing]

(1) Cast 16.25" x 6.25" x 52" cake
(2) Hot breakdown roll to 20.5" wide x 0.400" gauge
(3) Overhaul to 0.370" gauge
(4) Cold roll to 0.180" gauge
(5) Anneal and clean
(6) Cold roll to 0.080" gauge
(7) Slit coil to 6.312" wide x 0.080" gauge
(8) Weld tube 2" O.D. x 0.080" wall at 150 f.p.m., and cut at 17.8 ft.
(9) Stock the welded tubes:

When withdrawn from stock—

(10) Clean and anneal
(11) Draw to 1.625" O.D. x 0.055" wall
(12) Draw to 1.500" O.D. x 0.042" wall
(13) Cut tube in half to 21 ft. lengths
(14) Anneal
(15) Draw to 1.250" O.D. x 0.032" wall
(16) Straighten
(17) Cut to 2 ft. lengths and pack

Schedule II

[1.1875" O.D. x 0.035" wall—copper tubing]

(1) Cast 16" x 5" x 46" cake
(2) Hot breakdown roll to 20" wide x 0.265" gauge
(3) Overhaul to 0.235" gauge
(4) Cold roll to 0.080" gauge
(5) Slit coil to 6.312" wide x 0.080" gauge
(6) Weld tube 2" O.D. x 0.080" wall at 60 f.p.m., and cut to 20 ft. lengths
(7) Clean and anneal
(8) Draw to 1.515" O.D. x 0.062" wall
(9) Stock the annealed drawn tubes:

When withdrawn from stock—

(10) Cut in half to 16 ft. lengths
(11) Draw to 1.375" O.D. x 0.044" wall
(12) Draw to 1.1875" O.D. x 0.035" wall
(13) Cut in two to 16.5 ft. lengths
(14) Straighten
(15) Cut to 12.125" lengths and pack The rationale of the method of the invention will be better understood by reference to the accompanying drawing and the following description thereof.

Figure 2:
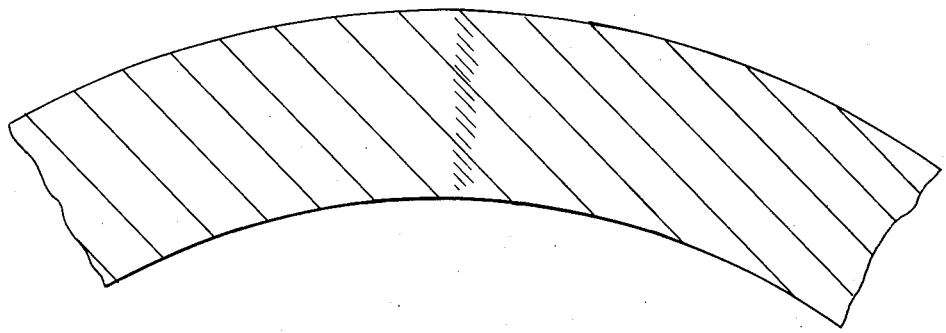

In the drawing,

FIG. 1 is an explanatory sectional view schematically showing the structure of the weld area of the tube directly after welding, and FIG. 2 is a similar schematic showing of the weld area of the tube following annealing.

As indicated by the shading in FIG. 1, the tube as welded has three metallographic zones in the vicinity of the weld zone, which have been designated zone I, zone II and zone III. Promptly following welding, the inside and outside weld beads A and A', respectively, are removed by scarfing. In the as-welded tube, that part of the tube unaffected by the welding heat (designated zone I) has the structure of the original cold rolled strip without a finish anneal. Zone II is a narrow heat-affected area adjacent to the weld point, and zone III is an extremely narrow dendritic zone at the weld point. The weld is mechanically weak and is characterized by low tensile strength and low ductility. The dendritic zone III acts as a stress concentration point whenever mechanical forces are applied to the tube. However, the weld itself is metallographically continuous and sound in structure, but with variations in structure and grain size throughout the weld area.

The grain structure of zones I, II and III is recrystallized by annealing to a uniform grain size as schematically indicated in FIG. 2, and the tube has uniform mechanical characteristics and uniform metallurgical structure. In the as-annealed tube, variations in structure and grain size have been recrystallized so that there is little evidence that the weld ever existed. With some weldable metals, especially alloys, there is a slight refinement of grain size in the original weld area. However, when the stock tube is subsequently finished by successive draws and anneals this refinement becomes more difficult to detect.

The initial cold rolled strip of weldable metal should be without a finish anneal. Annealed strip (for forming the tubular shape) is not suitable, since the grain size of such strip would already be enlarged prior to the welding operation. It is necessary to anneal the tube after welding and the combination of the two anneals separated only by light cold working in the forming section of the welding mill would cause excessively large grain size in the as-welded and annealed tube. This enlarged grain size would cause poor surface finish and would also possibly cause a number of breaks in the following series of drawing operations.

In the usual present-day commercial practice of tube welding the weld is actually stronger than the initial strip. In practicing the present invention the initial strip usually has a tensile strength of 10 to 15% stronger than the weld. For example, it has been found that with an initial copper strip having a tensile strength of about 81,000 pounds per square inch, the tensile strength of the weld produced in practicing the invention is about 71,000 pounds per square inch. This relatively weak weld is obtained by reducing the rate of power input into the tubular shape and increasing the speed of the welding. The power input to the tubular shape is limited to the minimum amount required to heat the edges of the open seam to a welding temperature. A greater power input at a given speed of welding would necessitate moving the induction coil further away from the pressure rolls in order to avoid overheating of the weld area. Since this would lengthen the path of the current in the tubular shape, the net result of the higher power inlet would be a greater dissipation of heat away from the edges of the open seam. The electrical input as measured in kilowatts is the rate of applying electric power in a given period of time. These kilowatts must be related to the speed of welding, the size of tube, the pattern of current distribution in the tube, and the current density along the edges of the open seam. By keeping the induction coil as close to the weld point as possible and by the proper induction coil design, the heating effect can be localized on the edges of the open strip. The result is the weld zone is an abrupt change in crystalline structure from the cold rolled structure of the parent strip to the welded dendritic structure. This abrupt change is continuous from the inside to the outside of the welded tube in the weld area. This dendritic structure has very little ductility and apparently acts as a focal point for any stresses applied to the welded tube. While this focal point problem (characteristic of the mechanically weak weld of the invention) can be avoided to some degree by dissipating more heat beyond the edges of the open seam, a mechanically strong weld can only be obtained by increasing the power input or reducing the speed of welding, thus sacrificing the advantages of the invention.

Compared with the heretofore conventional methods of producing welded tubes, the method of the invention has the following advantages:

(1) The invention makes it possible to obtain a greater speed of welding and higher production in pounds per hour. The metallographic soundness of the weld is stressed and not the mechanical strength of the tube as welded. In order to reduce the rate of power input into the tube and to increase the speed of welding, a mechanically weak weld is deliberately made. This is an extremely important feature of the invention.

(2) After an anneal and draw on the welded tube, a product is obtained having substantially the same metallographic structure and mechanical characteristics as tubing manufactured by conventional seamless tube practices.

(3) In drawing a finished tube from a stock tube, a further advantage results in that only a relatively small number of code sizes need be made and stocked. From these stock tubes of various code sizes a much larger number of different finished tube sizes can be made. As a result, the number of changeovers and different tool sets required can be reduced to a minimum. This is an important factor in reducing the cost of tubing produced by welding.

From a practical standpoint, the invention permits welding speeds of 1½ to 2 times (and often higher) than possible in the heretofore customary methods of producing a sound and strong finished weld. For example, in welding the hard brass tubing of Schedule I, welding speeds up to about 150 f.p.m. are obtainable, whereas previously a sound and strong finish weld could not be obtained at welding speeds in excess of about 75 f.p.m. Similarly, with the copper tubing of Schedule II the invention permits welding speeds up to about 60 f.p.m., contrasted with a speed not exceeding about 40 f.p.m. for producing a sound and strong finish weld. In the case of Schedules I and II, the power input to the induction coil would be approximately that determined by the maximum output of the power supply. This maximum output is about 50 kilowatts with the equipment currently available. If less power was used or if more power was available, the change in output power would be accompanied by a corresponding change in the welding speeds listed in the preceding examples.

I claim:

1. The method of producing a stock tube of weldable metal adapted to be worked by subsequent successive draws, and anneals if required, into finished tubing of different tube sizes which comprises forming a cold rolled strip of the weldable metal without a finish anneal into a tubular shape having a longitudinal open seam, longitudinally advancing the tubular shape through a welding zone where the edge portions of the seam are heated to welding temperature by a high frequency electric current and the heated edges are forced together by pressure, the speed with which the tube is advanced through the welding zone being such as to effect a metallographically sound weld characterized by a dendritic structure of variable grain size having relatively low tensile strength and of such relatively low ductility as to preclude the development of a mechanically strong weld directly by drawing, continuously scarfing both the inside and outside weld beads as welding progresses and thereby producing an as-welded stock tube characterized by the aforesaid weld, cleaning the as-welded stock tube, and annealing the clean stock tube to recrystallize the grain structure in the weld area.

2. The method of producing a stock tube of weldable metal according to claim 1 further characterized in that the annealed tube is drawn to effect a reduction in wall thickness and to obtain cold working of the metal and thereby producing a stock tube adapted to be diverted to a number of different finished sizes by subsequent successive draws and anneals if required.

3. The method of producing a stock tube of weldable metal adapted to be worked by subsequent successive draws, and anneals if required, into finished tubing of different tube sizes which comprises forming a cold rolled strip of the weldable metal without a finish anneal into a tubular shape having a longitudinal open seam, longitudinally advancing the tubular shape through a welding zone where the edge portions of the seam are heated to welding temperature by a circumferentially flowing electric current of high frequency induced in the shape by a surrounding induction coil and where the heated edges are forced together by pressure, the speed with which the tubular shape is advanced through the welding zone being such as to effect a metallographically sound weld characterized by a dendritic structure of variable grain size having relatively low tensile strength and of such relatively low ductility as to preclude the development of a mechanically strong weld directly by drawing, continuously scarfing both the inside and outside weld beads as welding progresses and thereby producing an as-welded stock tube characterized by the aforesaid weld, subsequently cleaning, annealing the clean stock tube to recrystallize the grain structure in the weld area and drawing the annealed tube to effect a reduction in wall thickness and to obtain cold working of the metal.

4. The method of claim 3 further characterized in that a circumferentially flowing electric current is induced in the tubular shape by a surrounding induction coil and the power input of the induction coil is substantially less than required to produce a strong finished weld with the tubular shape advancing at the same speed.

5. The method of claim 4 further characterized in that the as-welded tube is annealed to recrystallize the grain structure and the annealed tube is drawn to effect a reduction in wall thickness and to obtain cold working of the metal the resulting drawn tube being adapted to be diverted to a number of different finished sizes by subsequent successive draws and anneals if required.

6. The method of producing a copper-base stock tube adapted to be worked by subsequent successive draws, and anneals if required, into finished tubing of different tube sizes which comprises longitudinally advancing an open seam tubular shape formed of a cold rolled weldable copper-base metal strip through a welding zone where the edge portions of the seam are heated to welding temperature by a circumferentially flowing electric current of high frequency induced in the shape by a surrounding induction coil and the heated edges are forced together by pressure to effect a metallographically sound weld characterized by a dendritic structure of variable grain size having relatively low tensile strength and of such relatively low ductility as to preclude the development of a mechanically strong weld directly by drawing, the dendritic structure of the weld resulting from advancing the tubular shape through the welding zone at a relatively high speed with a power input to the induction coil substantially lower than required to produce a strong weld with the tubular shape advancing at the same speed, continuously scarfing both the inside and the outside weld beads as welding progresses to produce an as-welded tube characterized by the aforesaid mechanically weak weld, annealing the welded tube to recrystallize the grain structure in the weld area, drawing the annealed tube to effect a reduction in wall thickness and to obtain cold working of the metal and thereby producing a stock tube having a sound and uniform metallographic structure and uniform mechanical characteristics adapted to be diverted to a number of different finished sizes by subsequent successive draws and anneals if required.

References Cited in the file of this patent
UNITED STATES PATENTS

| | | |
|---|---|---|
| 2,673,276 | Allordt | Mar. 23, 1954 |
| 2,817,364 | Crawford | Dec. 24, 1957 |